United States Patent [19]

Furuto

[11] 4,055,869
[45] Nov. 1, 1977

[54] CLAMPING AND CUTTING APPARATUS

[75] Inventor: Takashi Furuto, Komatsu, Japan

[73] Assignee: Kabushiki Kaisha Komatsu Seisakusho, Tokyo, Japan

[21] Appl. No.: 751,728

[22] Filed: Dec. 17, 1976

[30] Foreign Application Priority Data

Dec. 17, 1975 Japan .......................... 50-169277[U]
Dec. 17, 1975 Japan .......................... 50-169278[U]

[51] Int. Cl.² ........................ B21D 43/10; B21K 1/46
[52] U.S. Cl. ...................................... 10/25; 10/11 T;
83/153
[58] Field of Search ............ 10/25, 11 T, 12 T, 72 T,
10/76 T; 83/153; 214/1 BB

[56] References Cited

U.S. PATENT DOCUMENTS 2,105,387  1/1938  Wilcox ..................................... 10/25
2,254,316  9/1941  Rider ..................................... 10/25 X

*Primary Examiner*—J. M. Meister
*Attorney, Agent, or Firm*—Armstrong, Nikaido & Marmelstein

[57] ABSTRACT

Clamping and cutting apparatus to be incorporated with a heading machine comprises a carriage having a shearing cutter mounted thereon and movable between a cutting position where rod-shaped work is cut to a predetermined length and a transfer position where the cut piece of work is transferred to the subsequent processing station. A clamp lever mounted on the carriage is connected via a toggle joint to a slider also mounted thereon, which slider is slidable either to a positive clamping position for causing the clamp lever to positively clamp the work against the cutter, a loose clamping position for causing the clamp lever to loosely clamp the work, or an unclamping position for causing the clamp lever to release the work. When the carriage is in the cutting position, the slider can be locked in the positive clamping position by a pivotal locking pawl via blocks of elastomeric material, and as the carriage travels to the transfer position upon completion of each cutting operation, the locking pawl is cam operated to permit the slider to be moved to the loose clamping position and thence to the unclamping position.

7 Claims, 7 Drawing Figures

CLAMPING AND CUTTING APPARATUS

BACKGROUND OF THE INVENTION

This invention relates to clamping and cutting apparatus, and more specifically to such apparatus of the type to be incorporated with a header or heading machine used for producing the heads of bolts, rivet, screws and like fasteners.

In clamping and cutting apparatus of the type under consideration, the positive clamping of work is a prerequisite for cutting it to the precise length or size required and for improving the dimensional accuracy of the end products. Further, when the apparatus is incorporated with a header or the like, it should be so constructed as to allow ready transfer of each severed piece of work to the subsequent processing station.

The clamping and cutting apparatus incorporated with a header has another serious problem arising when work, which is rod shaped, is cut to less than a predetermined length. If such an undersized piece of work is allowed to be transferred to the subsequent processing station such as the first forming station, troubles may take place such as the seizure of the forming die sections and the damage of transfer fingers.

SUMMARY OF THE INVENTION

It is an object of this invention to provide clamping and cutting apparatus capable of clamping work so positively that it can be cut to a precise size desired.

Another boject of the invention is to provide clamping and cutting apparatus well adapted for combined use with a header or the like, the apparatus being capable of transporting each severed piece of work to the subsequent processing station such as the first forming station of the header.

A further object of the invention is to provide clamping and cutting apparatus so constructed that each severed piece of work can be held positively clamped during transportation to the subsequent processing station.

A still further object of the invention is to provide clamping and cutting apparatus so constructed that in event work is cut to less than a predetermined size, the undersized piece of work can be automatically withdrawn from the apparatus before it reaches the subsequent processing station.

In accordance with this invention, briefly summarized, there is provided clamping and cutting apparatus comprising a carriage having cutter means thereon and movable between a cutting position where work is cut to a predetermined size and a transfer position where the cut piece of work is transferred to the subsequent processing station. A clamp lever pivotally mounted on the carriage is operatively connected to a slider supported by support means fixedly mounted on the carriage, with the slider being movable relative to the carriage between a clamping position for causing the clamp lever to clamp the work against the cutter means on the carriage and an unclamping position for causing the clamp lever to release the work. The slider is yieldably urged to move from the clamping to unclamping position by actuator means such as, for instance, a single-acting air cylinder having constant supply of pressurized air into its working chamber. A locking member is pivotally mounted on the support means for movement between a locking position for locking the slider in the clamping position and an unlocking position for permitting the slider to be moved from the clamping to unclamping position by the actuator means, with the locking member being spring biased to move from the unlocking to locking position.

The apparatus further comprises resilient means, preferably in the form of one or more blocks of elastomeric material, which is adapted to be compressed when the slider is locked in the clamping position, with the result that by virtue of the reactive force of the resilient means, the slider is urged to move further in such a direction that the clamp lever clamps the work more positively.

When the carriage is in the cutting position, the slider is moved to the clamping position by reciprocating means mounted on frame means of the apparatus and is locked in that position by the locking member. After the carriage has travelled from the cutting to transfer position upon completion of each cutting operation, cam means carried by the reciprocating means operates to cause the locking member to unlock the slider and hence to permit same to be moved from the clamping to unclamping position by the actuator means.

Thus, work to be cut can be positively clamped when the carriage is in the cutting position, and upon completion of the subsequent cutting operation, the cut piece of work can be transported to the next processing station by the carriage while being held positively clamped thereon. Further, the piece of work is unclamped automatically when the carriage reaches the transfer position.

According to a further feature of this invention, the locking member is capable of locking the slider in a loose clamping position, in addition to the aforementioned clamping position which is hereinafter termed the positive clamping position. When the slider is locked in the loose clamping position, the work is relatively loosely clamped by the clamp lever because then the resilient means such as blocks of elastomeric material is less compressed than when the slider is locked in the positive clamping position. After the carriage has travelled to the transfer position upon completion of each cutting operation, the locking member is operated by the cam means to permit the slider to be moved from the positive to loose clamping position and thence to the unclamping position, so that each cut piece of work is temporarily held loosely clamped in the transfer position before being finally unclamped.

According to a still further feature of this invention, second cam means is retractably mounted on the frame means and is adapted to be moved to its working position only when work is cut to less than a predetermined size. The second cam means when in its working position is effective to cause the locking member to unlock the slider immediately when or after the carriage starts travelling from the cutting toward transfer position. The undersized piece of work can therefore be unclamped for immediate withdrawal before the carriage reaches the transfer position.

The above and other objects, features and advantages of this invention and the manner of attaining them will become more apparent, and the invention itself will best be understood, upon consideration of the following description with reference had to the accompanying drawings showing a preferred embodiment of the invention.

DESCRIPTION OF THE PREFERRED EMBODIMENT

Figure 1:
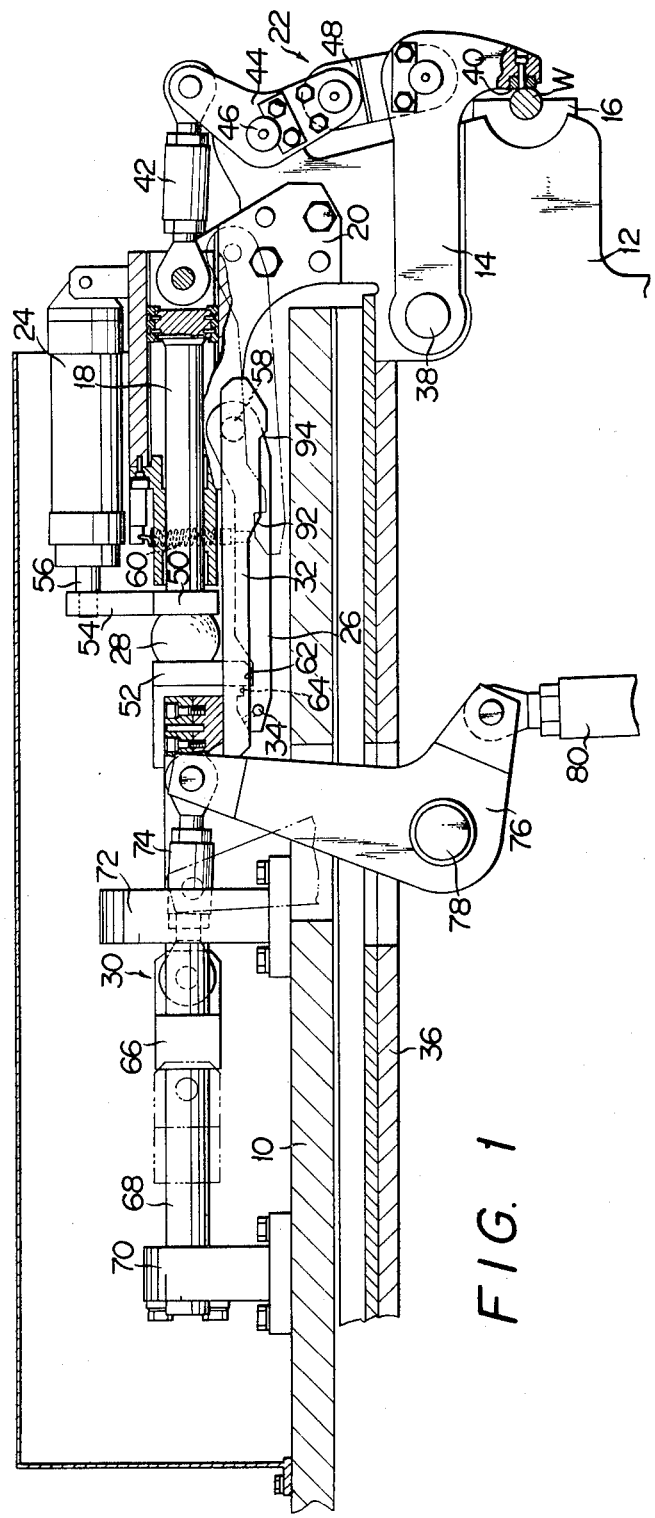
FIG. 1 is an elevational view, partly sectioned and partly broken away, of a preferred form of the clamping and cutting apparatus according to this invention.
Figure 2:
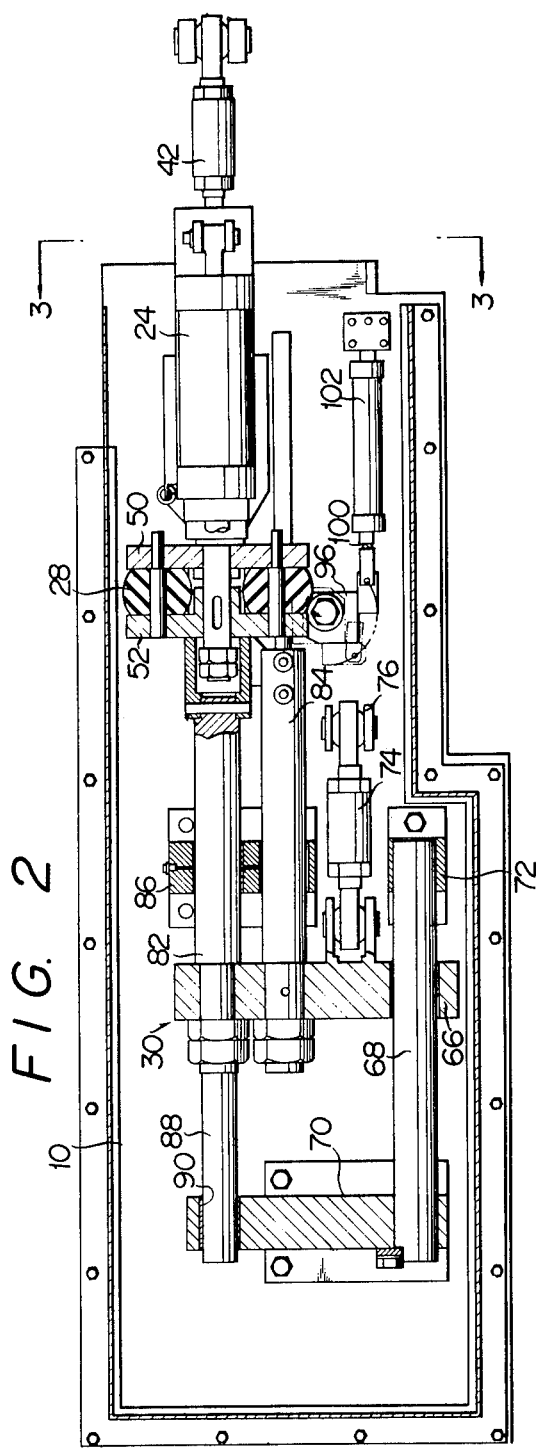
FIG. 2 is a partly sectioned top plan view of the apparatus of FIG. 1.

FIGS. 1 and 2 best illustrate a preferred form of the clamping and cutting apparatus according to this invention which can be incorporated with a header of prior art design. Broadly, the clamping and cutting apparatus comprises frame means including a platform 10, a carriage 12 reciprocally movable horizontally relative to the frame means, a clamp lever 14 pivotally mounted on the carriage for clamping rod-shaped work W against a shearing cutting 16 mounted on the carriage, a slider 18 in the form of a rod slidably supported by a support 20 fixedly mounted on the carriage and connected at one end to the clamp lever via a toggle joint 22, actuator means such as a single-acting air cylinder 24 connected to the other end of the slider 18 and tending to move same leftwardly, as seen in FIGS. 1 and 2, relative to the support 20, a locking pawl 26 pivotally mounted on the support for locking the slider 18 in such a position that the work W is clamped by the clamp lever 14 either positively or loosely, resilient means 28 adapted to be compressed when the slider 18 is locked by the locking pawl 26, reciprocating means 30 mounted on the platform 10 for movement toward and away from the support 20, and an elongate cam plate 32 carried by the reciprocating means 30 for actuating the locking pawl 26 via a cam follower pin 34 affixed thereto.

Figure 4:
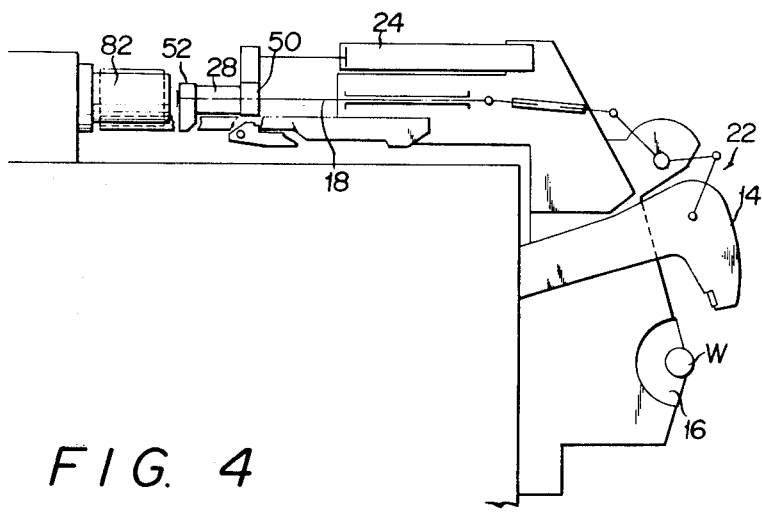
FIGS. 4 through 7 are schematic elevational views explanatory of the sequential steps of operation of the apparatus.
Figure 5:
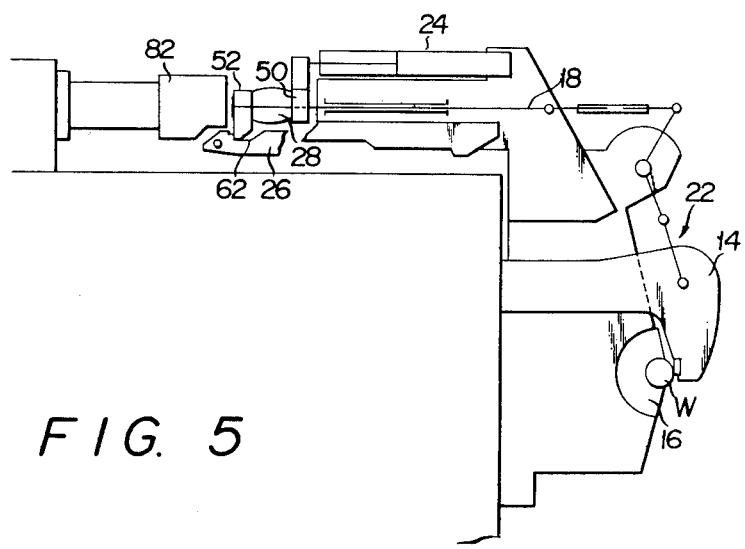
Figure 6:
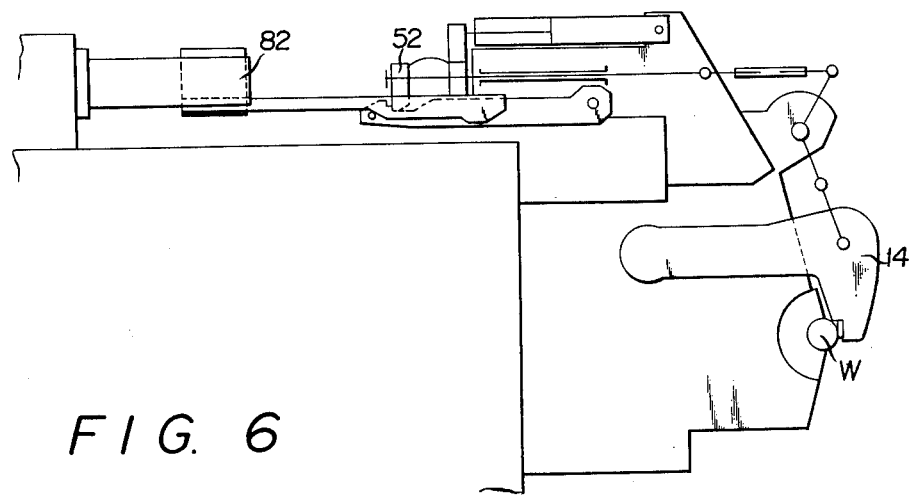
Figure 7:
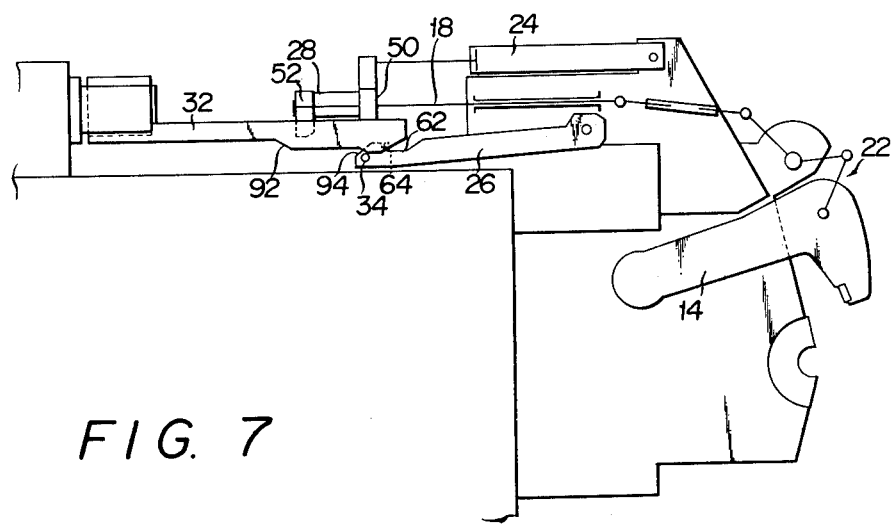

The carriage 12 is slidable along a slideway 36 under the platform 10 between a cutting position shown in FIGS. 1, 4 and 5, where the work W is cut to a predetermined length, and a transfer position shown in FIGS. 6 and 7, where the cut piece of work is transferred to the subsequent processing station such as the first forming station. The shearing cutter 16 is bolted or otherwise fastened to the carriage 12.

Pivotally pinned at 38 to the carriage 12, the clamp lever 14 has a clamping surface 40 of steel or like material to be pressed directly against the work W on the cutter 16. The free end of this clamp lever is operatively connected to the slider 18 via the toggle joint 22 and, preferably, a turnbuckle 42. The toggle joint 22 comprises a bell crank 44 fulcrumed at 46 on the carriage 12, and a link 48 pivotally connecting one of the arms of the bell crank to the clamp lever 14. The other arm of the bell crank 44 is pivotally connected to the turnbuckle 42 and thence to the slider 18.

The slider 18, slidably supported by the support 20, has its left hand end projecting outwardly therefrom, and on this projecting end of the slider there are mounted a pair of parallel spaced plate members 50 and 52 with the resilient means 28 sandwiched therebetween. The right hand plate member 50 is secured to the slider 18, but the left hand plate member 52 is slidably mounted thereon for movement toward and away from the right hand plate member within limits. Preferably, the resilient means 28 takes the form of one or more, two in the illustrated embodiment, blocks of elastomeric material such as polyurethane rubber.

As best seen in FIG. 1, the right hand plate member 50 has an upward extension 54, to which there is connected the piston rod 56 of the single-acting air cylinder 24 mounted on the support 20. This air cylinder has constant supply of pressurized air into its head end chamber from a suitable source of such pressurized air, not shown, so that the slider 18 is under constant pressure to move leftwardly relative to the support 20.

The locking pawl 26 is pivotally pinned at 58 to the support 20 and is biased to turn clockwise, as seen in FIG. 1, by a helical extension spring 60. The locking pawl 26 can be turned to either of first and second locking positions and an unlocking position by means hereinafter set forth.

In the first locking position the locking pawl 26 has its first step 62 in engagement with the left hand plate member 52 on the slider 18, as shown in FIGS. 1, 5 and 6, with the result that the slider is locked in a positive clamping position to cause the clamp lever 14 to clamp the work W via the turnbuckle 42 and the toggle joint 22. With the slider 18 thus locked in the positive clamping position, the blocks of elastomeric material 28 become compressed between the pair of plate members 50 and 52 to such an extent that a high reactive force is applied to the slider in such a direction as to add to the clamping force of the clamp lever 14. The work W can therefore be positively clamped against any possibility of dislodgement.

In the second locking position the locking pawl 26 has its second step 64 in engagement with the left hand plate member 52, with the result that the slider 18 is locked in a loose clamping position to cause the clamp lever 14 to clamp the work W relatively loosely. This is because the blocks of elastomeric material 28 are then significantly less compressed than when the slider 18 is locked in the positive clamping position.

In the unlocking position the locking pawl 26 is out of engagement with the left hand plate member 52 as shown in FIGS. 4 and 7. The slider 18 is therefore free to be moved leftwardly to an unclamping position, also as shown in FIGS. 4 and 7, by the air cylinder 24 relative to the support 20. The work W is then released by the clamp lever 14.

The reciprocating means 30 comprises a yoke 66 slidable along a guide rod 68 extending between upstanding support members 70 and 72 mounted on the platform 10. The yoke 66 is pivotally connected to a turnbuckle 74 and thence to one of the arms of a bell crank 76 which is fulcrumed at 78 on a stationary enclosure, not shown, of the carriage 12. The other arm of the bell crank 76 is pivotally connected to a rod 80 which is moved up and down by, for instance, a cam mechanism associated with the drive mechanism, not shown, of the carriage 12.

Also included in the reciprocating means 30 are first and second reciprocating rods 82 and 84 which are both rigidly connected to the yoke 66 and which slidably extend through a guide block 86 on the platform 10 in parallel spaced relationship. The first reciprocating rod 82 has a leftward extension 88 slidably extending through a guide hole 90 formed in the support member 70. The right hand end of this first reciprocating rod is disposed opposite to the left hand plate member 52 for movement into and out of abutting contact therewith.

Thus, with the up-and-down motion of the rod 80, the yoke 66 together with the first and second rods 82 and 84 is reciprocated between a right hand position indicated by the solid lines in FIG. 1 and a left hand position indicated by the dot-and-dash lines in the same drawing. Upon movement of the yoke 66 to the right hand position while the carriage 12 is in the cutting position, the slider 18 is moved to the positive clamping position by the first reciprocating rod 82 against the forces of the air cylinder 24 and blocks of elastomeric material 28 and is locked in that position by the locking pawl 26, as shown in FIG. 5.

Affixed to the second rod 84 of the reciprocating means 30, the elongate cam plate 32 has first and second sloping edges or surfaces 92 and 94 for sliding contact with the cam follower pin 34 extending laterally from the free end of the locking pawl 26. During the leftward stroke of the yoke 66 while the carriage 12 is in the transfer position of FIG. 6, the locking pawl 26 is turned from its first to second locking position against the force of the extension spring 60 as the cam follower pin 34 relatively slides down the first cam edge 92, so that the slider 18 is moved from its positive to loose clamping position. Subsequently, as the cam follower pin 34 relatively slides down the second cam edge 94 upon completion of the leftward stroke of the yoke 66, the locking pawl 26 is turned from its second locking to unlocking position against the force of the extension spring 60. Thereupon the slider 18 is moved from its loose clamping to unclamping position by the air cylinder 24, so that the clamp lever 14 releases the work W as shown in FIG. 7.

Figure 3:
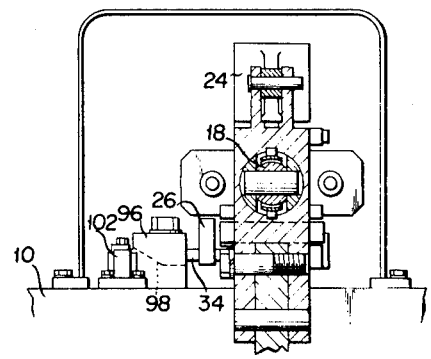
FIG. 3 is a vertical sectional view taken along the line 3—3 of FIG. 2.

As illustrated in FIGS. 2 and 3, another cam 96 is pivotally mounted on the platform 10 for 90° angular displacement between operative and inoperative positions. In the operative position the cam 96 has its sloping surface 98 disposed opposite to the cam follower pin 34 for turning the locking pawl 26 from its first locking to unlocking position against the force of the extension spring 60 immediately when or after the carriage 12 starts travelling from the cutting toward transfer position. In the inoperative position the cam 96 permits unobstructed passage therepast of the cam follower pin 34 during the travel of the carriage 12 between the cutting and transfer positions. The cam 96 is operatively connected to the piston rod 100 of a fluid actuated cylinder 102, preferably an air cylinder, so as to be thereby moved between its operative and inoperative positions.

Normally, the cam 96 is held in its inoperative position and is turned to its operative position by the air cylinder 102 only when the work W is cut to less than a predetermined length. Such an undersized piece of work is detected by means comprising a proximity switch associated with a rotary cam mechanism, both not shown, and a solenoid valve or the like, also not shown, is thereby actuated for delivering pressurized air into the head end chamber of the air cylinder 102 and hence for turning the cam 96 from its inoperative to operative position.

OPERATION

While the operation of the clamping and cutting apparatus according to this invention is believed clearly apparent from the foregoing description, further amplification will be made in the following brief summary of such operation, with reference had principally to FIGS. 4 through 7.

In FIG. 4 the carriage 12 is shown in the cutting position, and the yoke 66 together with the first and second reciprocating rods 82 and 84 in the left hand position. The left hand plate member 52 is now unlocked from the locking pawl 26, so that the slider 18 is moved to and held in the unclamping position by the air cylinder 24 via the right hand plate member 50. The clamp lever 14 is therefore pivoted away from the cutter 16 via the turnbuckle 42 and the toggle joint 22.

While the apparatus is in the condition of FIG. 4, the rod-shaped work W is fed a predetermined distance and placed in position on the cutter 16. Then the rod 80 of FIG. 1 is lowered to move the yoke 66 to the right hand position via the bell crank 76 and the turnbuckle 74, as shown in FIG. 5. As the first reciprocating rod 82 connected to the yoke 66 is thus moved rightwardly, the slider 18 is thereby moved in the same direction via the left hand plate member 52, blocks of elastomeric material 28 and right hand plate member 50 against the force of the air cylinder 24, until the left hand plate member becomes engaged by the first step 62 of the locking pawl 26 with the blocks of elastomeric material compressed to the maximum between the pair of plate members 50 and 52. With the slider 18 thus locked in the positive clamping position, the work W is positively clamped by the clamp lever 14 against the cutter 16. It should be appreciated that the compressed blocks of elastomeric material 28 coact with the toggle joint 22 to enable the positive clamping of the work W by the clamp lever 14.

The work W is then cut to a predetermined length, and the cut piece of work is held positively clamped by the clamp lever 14. The method of cutting the work is conventional, so that its description is omitted.

Upon completion of the cutting operation, the carriage 12 together with the clamp lever 14, support 20 and other means mounted thereon is moved from the cutting to transfer position, while the yoke 66 together with the first and second reciprocating rods 82 and 84 is left in the right hand position, as shown in FIG. 6. It will be apparent from the drawing that the cut piece of work W is held positively clamped throughout the course of travel of the carriage 12 from the cutting to transfer position.

When the carriage 12 reaches the transfer position with the positively clamped piece of work W, the rod 80 of FIG. 1 is raised by the unshown cam mechanism to move the yoke 66 from the right to left hand position. As the cam plate 32 carried by the second reciprocating rod 84 travels leftwardly with the yoke 66, its first sloping edge 92 slides over the cam follower pin 34 to turn the locking pawl 26 counterclockwise from its first to second locking position against the force of the extension spring 60. As a consequence, the slider 18 moves leftwardly a slight distance from its positive to loose clamping position, and the blocks of elastomeric material 28 become less compressed than when the slider is locked in the positive clamping position. The piece of work W is now only loosely clamped by the clamp lever 14.

At the end of the leftward stroke of the yoke 66, the second sloping edge 94 of the cam plate 32 slides over the cam follower pin 34 to turn the locking pawl 26 further counterclockwise from its second locking to unlocking position against the force of the extension spring 60. Then, as illustrated in FIG. 7, the slider 18 is moved further leftwardly from its loose clamping to unclamping position by the air cylinder 24, with the blocks of elastomeric material 28 recovering their original shape. The clamp lever 14 is therefore pivoted counterclockwise to release the piece of work W, which may then be fed into the die of the first forming station of the header by suitable means. Thereafter the foregoing cycle of clamping, cutting and transferring operations is repeated.

In event the work W is cut to less than a predetermined length, the aforesaid detecting means actuates the unshown solenoid valve to deliver pressurized air into the head end chamber of the air cylinder 102. The piston rod 100 of this air cylinder is then extended to cause the 90 degrees angular motion of the cam 96 from its inoperative to operative position, as depicted in FIG. 2. The sloping surface 98 of the cam 96 is now disposed opposite to the cam follower pin 34 on the locking pawl 26.

Thus, immediately when or after the carriage 12 subsequently starts travelling from the cutting toward transfer position, the cam follower pin 34 becomes engaged by the cam 96 and slides down its sloping surface 98. The locking pawl 26 is therefore turned counterclockwise from its first locking to unlocking position past the second locking position against the force of the extension spring 60. Since then the slider 18 is moved leftwardly from its positive clamping to unclamping position past the loose clamping position by the air cylinder 24, the clamp lever 14 is turned counterclockwise to release the undersized piece of work.

The undersized piece of work, released by the clamp lever 14, is to be withdrawn from the cutter 16 before the carriage 12 reaches the transfer position. This objective can be accomplished by use of, for example, a forced flow of air for blowing away the undersized piece of work from the cutter 16. The means for producing such a flow of air is not illustrated because it is considered easy for the specialits to devise such means.

While the clamping and cutting apparatus in accordance with this invention has been shown and described in terms of its specific form, it is understood that the invention itself is not to be restricted by the exact details of this disclosure. Numerous modifications or changes will readily occur to those skilled in the art without departing from the spirit or scope of the invention as sought to be defined by the following claims.

What is claimed is:

1. In clamping and cutting apparatus of the type incorporated with a header or the like, the combination of:
    frame means;
    a carriage having cutter means thereon and movable between a cutting position and a transfer position relative to said frame means;
    a clamp lever pivotally mounted on said carriage for clamping work against said cutter means;
    support means on said carriage;
    a slider supported by said support means and operatively connected to said clamp lever, said slider being slidable relative to said support means between a clamping position for causing said clamp lever to clamp the work against said cutter means and an unclamping position for causing said clamp lever to release the work;
    actuator means on said support means tending to move said slider from said clamping to said unclamping position;
    a locking member mounted on said support means for pivotal movement between a locking position for locking said slider in said clamping position and an unlocking position for permitting said slider to be moved from said clamping to said unclamping position by said actuator means;
    spring means yieldably urging said locking member from said unlocking to said locking position;
    resilient means adapted to be compressed when said slider is locked in said clamping position by said locking member for exerting a reactive force on said slider, whereby said slider is urged to move further in such a direction that said clamp lever clamps the work more positively;
    reciprocating means mounted on said frame means for movement toward and away from said support means, whereby upon movement of said reciprocating means toward said support means while said carriage is in said cutting position said slider is moved to and locked in said clamping position against the forces of said actuator means and said resilient means;
    cam follower means on said locking member; and
    cam means carried by said reciprocating means and adapted to move said locking member from said locking to said unlocking position via said cam follower means against the force of said spring means upon movement of said reciprocating means away from said support means while said carriage is in said transfer position.

2. The clamping and cutting apparatus as recited in claim 1, wherein said locking member is further movable to a second locking position for locking said slider in a loose clamping position, said resilient means being adapted to be less compressed when said locking member is in said second locking position than in the first mentioned locking position so that said clamp lever clamps the work relatively loosely when said slider is locked in said loose clamping position, and wherein said cam means is further adapted to move said locking member from said first locking position to said unlocking position via said second locking position upon movement of said reciprocating means away from said support means while said carriage is in said transfer position.

3. The clamping and cutting apparatus as recited in claim 1, wherein said actuator means is a single-acting air cylinder having constant supply of pressurized air.

4. The clamping and cutting apparatus as recited in claim 1, wherein said resilient means comprises at least one block of elastomeric material.

5. The clamping and cutting apparatus as recited in claim 1, further comprising a toggle joint through which said slider is connected to said clamp lever.

6. The clamping and cutting apparatus as recited in claim 1, further comprising:
    second cam means mounted on said frame means so as to be movable between an operative position and an inoperative position, said second cam means when in said operative position being capable of moving said locking member from said locking to said unlocking position via said cam follower means against the force of said spring means during movement of said carriage from said cutting to said transfer position; and
    second actuator means for selectively moving said second cam means between said operative and said inoperative position.

7. The clamping and cutting apparatus as recited in claim 6, wherein said second actuator means is a fluid actuated cylinder.

* * * * *